(12) United States Patent
Gulati et al.

(10) Patent No.: US 9,183,147 B2
(45) Date of Patent: Nov. 10, 2015

(54) PROGRAMMABLE RESOURCES TO TRACK MULTIPLE BUSES

(75) Inventors: Manu Gulati, Saratoga, CA (US);
James D. Ramsay, San Jose, CA (US);
Kevin R. Walker, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 13/590,150

(22) Filed: Aug. 20, 2012

(65) Prior Publication Data
US 2014/0052929 A1 Feb. 20, 2014

(51) Int. Cl.
*G06F 12/08* (2006.01)

(52) U.S. Cl.
CPC .......... *G06F 12/0815* (2013.01); *G06F 12/084* (2013.01); *G06F 12/0831* (2013.01); *Y02B 60/1225* (2013.01)

(58) Field of Classification Search
CPC .............. G06F 11/108; G06F 11/2257; G06F 12/0853; G06F 12/0815; G06F 13/42; G06F 9/384; G06F 9/34; G06F 2201/88; G06F 11/3471; G06F 2221/0737; G06F 9/466; G06F 12/0831; G06F 12/0817; G06F 12/084; Y02B 60/1225
USPC ......................................................... 711/141
See application file for complete search history.

(56) References Cited

U.S. PATENT DOCUMENTS

| | | | |
|---|---|---|---|
| 6,556,952 B1 * | 4/2003 | Magro | 702/183 |
| 6,834,365 B2 | 12/2004 | Bardsley et al. | |
| 7,047,320 B2 * | 5/2006 | Arimilli et al. | 710/5 |
| 7,340,564 B2 * | 3/2008 | Twomey | 711/125 |
| 2002/0059511 A1 * | 5/2002 | Sudo et al. | 712/207 |
| 2009/0063780 A1 * | 3/2009 | Terechko et al. | 711/141 |
| 2010/0318752 A1 * | 12/2010 | Schwarz et al. | 711/154 |
| 2011/0314264 A1 * | 12/2011 | Horley et al. | 712/227 |

* cited by examiner

*Primary Examiner* — Aimee Li
*Assistant Examiner* — Alex Olson
(74) *Attorney, Agent, or Firm* — Rory D. Rankin; Meyertons, Hood, Kivlin, Kowert & Goetzel, P.C.

(57) ABSTRACT

A system and method for efficiently monitoring traces of multiple components in an embedded system. A system-on-a-chip (SOC) includes a trace unit for collecting and storing trace history, bus event statistics, or both. The SOC may transfer cache coherent messages across multiple buses between a shared memory and a cache coherent controller. The trace unit includes multiple bus event filters. Programmable configuration registers are used to assign the bus event filters to selected buses for monitoring associated bus traffic and determining whether qualified bus events occur. If so, the bus event filters increment an associated count for each of the qualified bus events. The values used for determining qualified bus events may be set by programmable configuration registers.

25 Claims, 9 Drawing Sheets

PROGRAMMABLE RESOURCES TO TRACK MULTIPLE BUSES

BACKGROUND OF THE INVENTION

1. Field of the Invention

This invention relates to electronic circuits, and more particularly, to efficiently monitoring traces of multiple components in an embedded system.

2. Description of the Relevant Art

A system-on-a-chip (SOC) integrates multiple functions into a single integrated chip substrate. The functions may include digital, analog, mixed-signal and radio-frequency (RF) functions. Typical applications are used in the area of embedded systems. Cellular phones, smartphones, portable communication devices, tablet computers, entertainment audio/video (A/V) devices, and even chip in automobiles are some examples of systems using an SOC. An SOC may use processors that execute operating system (OS) software. In addition, the SOC may be connected to both external memory chips, such as Flash or RAM, and various external peripherals.

As integration on an SOC increases, the interrelationships between on-die components become more complex. In addition, embedded systems may not have a basic-input-output-software (BIOS) or machine abstraction layer to insulate the operating system (OS) from low-level device management. Therefore, the kernel in the OS may handle these tasks. The shortening time-to-market coupled with the increasing complexity of both hardware and software creates a number of challenges to verify embedded system designs.

Basic run-control debugging includes single-stepping, breakpoints, and access to memory and a component's registers while the component is not running. Basic run-control debugging typically uses a Joint Test Action Group (JTAG) interface. However, this type of debugging is obtrusive as it interferes with the program execution. In addition, setting breakpoints is not beneficial for debugging real-time embedded systems.

Another type of debugging includes an unobtrusive real-time collection of a history during program execution. A stored program history allows designers to perform a walk through of a program to a point of failure, which benefits investigations of intermittent and real-time failures. Software and hardware traces provide a historical account of application code execution, behavior, timing, and data accesses. A hardware trace is on-die logic that may monitor one or more of an address, data, and control signals within the SOC and sends corresponding information to be stored in a trace capture buffer, or trace buffer. The trace buffer is typically an on-die circular buffer that continuously captures trace information until halted.

Capturing program and data traces for a complete program unobtrusively and in real-time may require large on-die trace buffers and wide trace ports. A large amount of distributed trace hardware may still miss the temporal relationship between asynchronous requests across the SOC. Even reduced hardware support for integrating hardware traces on the SOC and sending out information through trace ports consumes on-die real estate. Therefore, designers prefer a limited amount of debug hardware on the SOC, but also debug hardware that provides flexibility and a high degree of visibility to the activities occurring on the SOC.

In view of the above, methods and mechanisms for efficiently monitoring traces of multiple components in an embedded system are desired.

SUMMARY OF EMBODIMENTS

Systems and methods for efficiently monitoring traces of multiple components in an embedded system are contemplated. In various embodiments, a system-on-a-chip includes a trace unit for collecting and storing trace history and collecting qualified bus event statistics, such as bus event counts. The SOC may transfer cache coherent messages across multiple buses between a shared memory and a cache coherent controller. The cache coherent controller may provide to multiple integrated circuit (IC) devices a consistent data value for a given data block in the shared memory. Control logic within the SOC may select one or more buses for monitoring bus traffic. The control logic may monitor the selected one or more buses for one or more qualified bus events. The qualified bus events include at least a match between a value on a given bus of the selected buses and a second value stored in programmable configuration registers. The values may correspond to at least one of the following: an IC device identifier (ID), a thread ID, a trust zone mapping, a memory address, and a cache coherence command. In response to determining one or more qualified bus events, the control logic executes an associated trace instruction.

The trace unit may include multiple bus event filters. Programmable configuration registers may be used to assign the bus event filters to the selected buses for monitoring associated bus traffic. The bus event filters may also determine whether qualified bus events occur. In response to determining one or more of the qualified bus events occur, the bus event filters increment an associated count for each of the qualified bus events. One or more trace instructions may cause a trace history, trace statistics including at least the associated counts, or both to be stored in a trace capture buffer.

These and other embodiments will be further appreciated upon reference to the following description and drawings.

BRIEF DESCRIPTION OF THE DRAWINGS

FIG. 9 is a generalized flow diagram of one embodiment of a method for beginning trace capture for debugging bus activity on an integrated circuit While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 1:
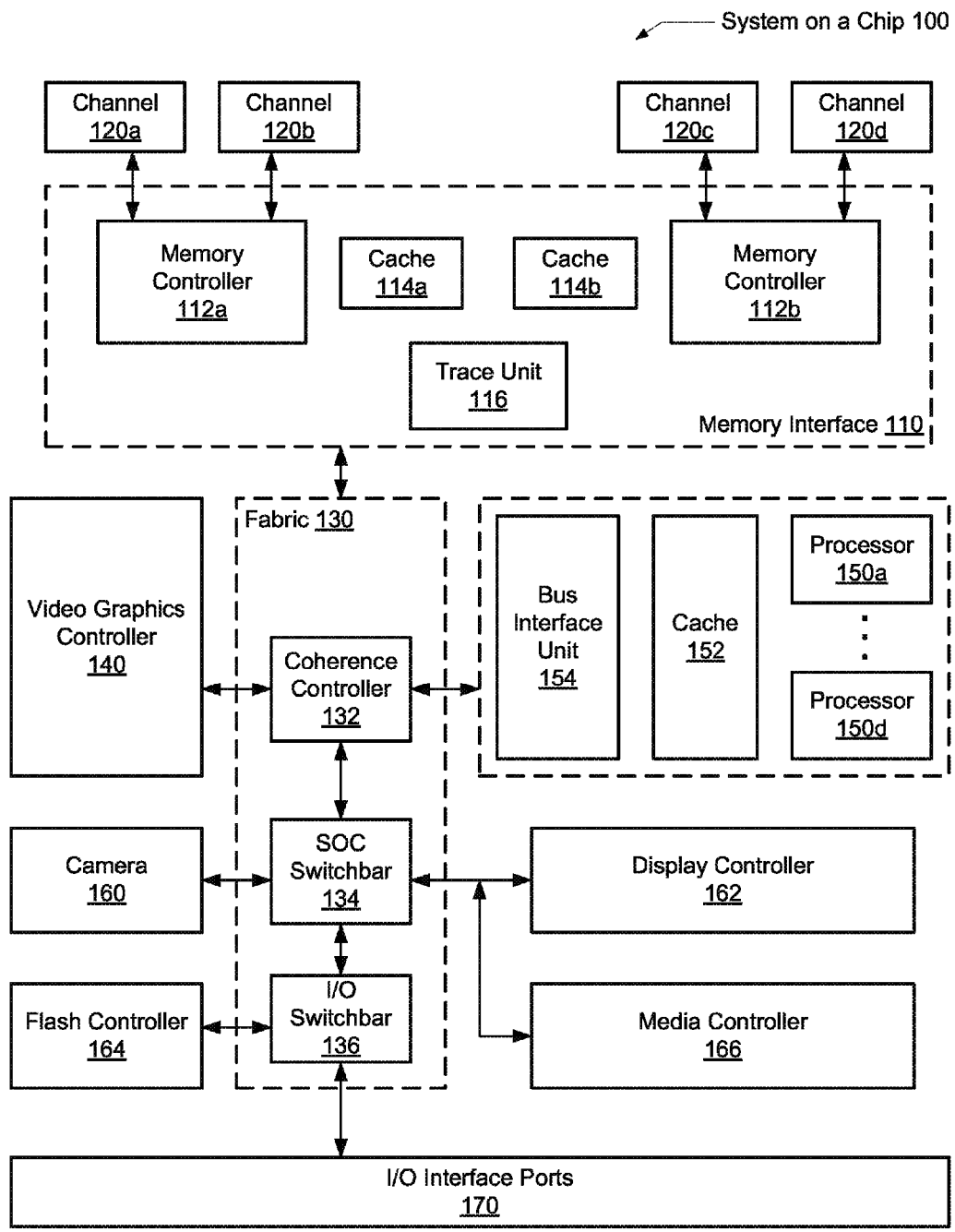
FIG. 1 is a generalized block diagram of one embodiment of a system-on-a-chip (SOC).

Referring to FIG. 1, a generalized block diagram illustrating one embodiment of a system-on-a-chip (SOC) 100 is shown. The SOC 100 is an integrated circuit (IC) that includes multiple types of IC designs on a single semiconductor die, wherein each IC design provides a separate functionality. Traditionally, each one of the types of IC designs may have been manufactured on a separate silicon wafer. In the illustrated embodiment, the SOC 100 includes multiple IC designs, a fabric 130 for interconnects and chip communication, a memory interface 110, and various input/output (I/O) interfaces 170. Clock sources, such as phase lock loops (PLLs), and a centralized control block for at least power management are not shown for ease of illustration.

The multiple IC designs within the SOC 100 may include various analog, digital, mixed-signal and radio-frequency (RF) blocks. For example, the SOC 100 may include one or more processors 150a-150d with a supporting cache hierarchy that includes at least cache 152. In addition, the multiple IC design may include a flash memory controller 164 and a media controller 166. Further, the multiple IC designs may include a video graphics controller 140 and one or more processing blocks associated with real-time memory performance for display and camera subsystems, such as camera 160.

Any real-time memory peripheral processing blocks may include image blender capability and other camera image processing capabilities as is well known in the art. The SOC 100 may group processing blocks associated with non-real-time memory performance, such as the media controller 166, for image scaling, rotating, and color space conversion, accelerated video decoding for encoded movies, audio processing and so forth. The units 160 and 166 may include analog and digital encoders, decoders, and other signal processing blocks. In other embodiments, the SOC 100 may include other types of processing blocks in addition to or in place of the blocks shown.

In various embodiments, the fabric 130 provides a top-level interconnect for the SOC 100. For example, connections to the cache coherence controller 132 may exist for various requestors within the SOC 100. A requestor may be one of the multiple IC designs on the SOC 100. The cache coherence controller 132 may provide to the multiple IC designs a consistent data value for a given data block in the shared memory, such as off-chip dynamic random access memory (DRAM). The coherence controller 132 may use a cache coherency protocol for memory accesses to and from the memory interface 110 and one or more caches in the multiple IC designs on the SOC 100. An example of a cache coherency protocol includes the MOESI protocol with the Modified (M), Owned (O), Exclusive (E), Shared (S), and Invalid (I) states.

In some embodiments, one requestor connection to the coherence controller 132 may be provided for one or more graphics processing units (GPUs) within the video graphics controller 140, one requestor connection for the processor cores 150a-150d, and one request connection for the remainder of the multiple IC designs and the I/O interface ports 170 on the SOC 100. The SOC switchbar 134 may be used to aggregate traffic from these remaining multiple IC designs.

In various embodiments, different types of traffic may flow independently through the fabric 130. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels.

The coherence controller 132 may allow memory access requests from any requestor on the SOC 100 to snoop the cache 152. Thus, data produced by the processors 150a-150d may not be explicitly flushed for the data to be visible to the other IC designs of the multiple IC designs on the SOC 100. If the most recent copy of data is present in the cache 152, then read requests may receive the most recent copy from the cache 152.

For write requests, merging may be performed for a cache line present in the cache 152 for any requestor on the SOC 100. If another requestor updates each byte of the cache line, then the data in the cache 152 may be invalidated. In some embodiments, the cache coherence scheme performed by the coherence controller 132 may not keep track of the state of any other cache on the SOC 100. For example, one or more GPUs may have associated caches or buffers. In addition, other processors outside of the processors 150a-150d may be on the SOC 100 and include their own caches. The initial fill into these other caches may receive the most recent copy of data, but modifications to the data may not be tracked or kept consistent with the cache 152. In some embodiments, the cache 152 may be a shared level two (L2) cache for the processors 150a-150d.

The memory interface 110 may include one or more memory controllers and one or more memory caches for the off-chip memory, such as dynamic random access memory (DRAM). The memory caches may be used to reduce the demands on memory bandwidth and average power consumption. In various embodiments, the memory interface 110 includes memory controllers 112a-112b and memory caches 114a-114b. As shown, in some embodiments, the memory controllers 112a-112b may not be a coherency point within the SOC 100 as they are separate from the coherence controller 132. This separation may allow an associated system level memory cache, such as caches 114a-114b, to be inserted in the path to memory. The memory caches 114a-114b may be logically located between the coherence controller 132 and the memory controllers 112a-112b. Additionally, the memory caches 114a-114b may not participate in a cache coherency protocol.

The memory caches 114a-114b may be used by each one of the multiple IC designs on the SOC 100. The allocation policy for the memory caches 114a-114b may be programmable. The memory caches 114a-114b may also be used in a synchronous RAM (SRAM) mode for system boot and system debug. One or more memory channels 120a-120d may be connected to the memory interface 110. Each of the memory channels 120a-120d may be a separate interface to a memory, such as a dynamic random access memory (DRAM). The memory controllers 112a-112b may include request queues for queuing memory requests. The memory controllers 112a-112b may also include logic for supporting a given protocol used to interface to the memory channels 120-120d. The protocol may determine values used for information transfer, such as a number of data transfers per clock cycle, signal voltage levels, signal timings, signal and clock phases and clock frequencies. Protocol examples include DDR2 (Double Data Rate, version 2) SDRAM, DDR3 SDRAM, GDDR4 (Graphics Double Data Rate, version 4) SDRAM, and GDDR5 (Graphics Double Data Rate, version 5) SDRAM.

The interface between the combination of the memory interface 110 and the coherency controller 132 and the remainder of the SOC 100, which includes the multiple IC designs and the switch bars 134 and 136, includes multiple buses. The multiple buses within this interface may offer visibility of fabric activity within the SOC 100 along with a global ordering point across the SOC 100. Asynchronous memory requests, responses, snoops, snoop responses, and input/output (I/O) transactions are visible at this interface with temporal relationships. A single coherence point on the SOC 100 offers this global ordering point visibility of the activity occurring on the SOC 100.

Capturing transaction information, such as traces and statistics, at the coherence point interface may offer a high degree of visibility to the activities occurring on the SOC 100. This visibility may also offer an efficient and flexible manner to debug the design of the SOC 100. Although the SOC 100 may include multiple buses in a hierarchical structure distributed across the SOC 100, having a distributed debug monitoring system may be replaced with a centralized debug monitoring system at the coherence point interface.

Multiple buses may be located at the coherence point. Cache coherent traffic passes through the coherence point providing high visibility to system traffic. In some embodiments, traffic monitoring hardware or resources may be used for unobtrusive collection of history for each of the multiple buses located at the coherence point. However, flexibility may be limited. During system debugging, a designer may wish to monitor multiple events on one or more buses while not monitoring one or more other buses. With dedicated traffic monitoring hardware or resources for unobtrusive monitoring for each bus, this type of debugging may be unavailable. Providing multiple traffic monitoring resources for each of the multiple buses may consume an appreciable amount of on-die real estate.

Additionally, one or more buses may be grouped into a class. For example, the coherence point on the SOC 100 may have symmetrical right and left buses for traffic flow. The asynchronous memory requests, responses, and snoop responses may be directed to either a corresponding right bus or a corresponding left bus. Each of the left buses may be grouped into a first class and each of the right buses may be grouped into a second class. In addition, both left and right memory requests may be grouped into a fourth class, both left and right responses may be grouped into a fifth class, and so forth. Table 1 below illustrates one embodiment of representing bus classes at a coherence point on an SOC. Here, bus traffic flow uses symmetrical left and right buses. The bus traffic type and the bus traffic flow direction may be used to define the classes.

TABLE 1

| Bus Classes at Coherence Point | |
| --- | --- |
| Bus | Bus Class |
| Coherence Command | Coherence Command |
| Coherence Response Right | Coherence Response |
| Coherence Response Left | |
| Memory Request Right | Memory Request |
| Memory Request Left | |
| Memory Response Right | Memory Response |
| Memory Response Left | |

A designer may wish to monitor a bus class, rather than individual buses. However, providing multiple traffic monitoring resources for both individual buses and classes of buses again may consume an appreciable amount of on-die real estate. Further, a designer may wish to collect statistics of events rather than or in addition to actual traces. The trace unit 116 on the SOC 100 may provide flexible on-die debug options without consuming an appreciable amount of on-die real estate.

As shown, the trace unit 116 is located within the memory interface 110. However, in other embodiments, the trace unit 116 may be located in the fabric 130. The trace unit 116 may provide flexible on-die debug resources for the SOC 100. The trace unit 116 may include multiple debug hardware resources, wherein each is programmable to filter bus traffic events on a given bus or a given bus class. One or more control and status registers (CSRs) may be programmed within the trace unit 116. The CSRs may also be referred to as configuration registers. Finding matches between values in bus traffic on a given bus or class being monitored and values stored in the configuration registers may trigger execution of a tracing operation or instruction and/or incrementing a given count corresponding to the event that caused the match. Before providing further details of the trace unit 116, a further description of the other components of the SOC 100 is provided.

Each one of the processors 150a-150d may include one or more cores and one or more levels of a cache memory subsystem. Each core may support the out-of-order execution of one or more threads of a software process and include a multi-stage pipeline. Each one of the processors 150a-150d may include circuitry for executing instructions according to a predefined general-purpose instruction set. For example, the PowerPC® instruction set architecture (ISA) may be selected. Alternatively, the ARM®, x86®, x86-64®, Alpha®, MIPS®, PA-RISC®, SPARC® or any other instruction set architecture may be selected.

Generally, the processors 150a-150d may include multiple on-die levels (L1, L2, L3 and so forth) of caches for accessing data and instructions. If a requested block is not found in the on-die caches or in the off-die cache 152, then a read request for the missing block may be generated and transmitted to the memory interface 110 or to on-die flash memory (not shown) controlled by the flash controller 164. The flash memory may be a non-volatile memory block formed from an array of flash memory cells. Alternatively, the memory 150 may include other non-volatile memory technology. The bus interface unit (BIU) 154 may provide memory access requests and responses for at least the processors 150a-150d.

The processors 150a-150d may share the on-chip flash memory and the off-chip DRAM accessed through the memory interface 110 with other processing blocks, such as graphics processing units (GPUs), application specific integrated circuits (ASICs), and other types of processor cores. Therefore, typical SOC designs utilize acceleration engines, or accelerators, to efficiently coordinate memory accesses and support coherent transactions between processing blocks and peripherals. In a SOC design that includes multiple processors and processing blocks, these components communicate with each other to control access to shared resources. The coherence controller 132 in the fabric 130 may manage memory coherence.

Other processor cores on SOC 100 may not include a mirrored silicon image of processors 150a-150d. These other processing blocks may have a micro-architecture different from the micro-architecture used by the processors 150a-150d. For example, other processors may have a micro-architecture that provides high instruction throughput for a computational intensive task, such as a single instruction multiple data (SIMD) core. Examples of SIMD cores include graphics processing units (GPUs), digital signal processing (DSP) cores, or other. For example, the video graphics controller 140 may include one or more GPUs for rendering graphics for games, user interface (UI) effects, and other applications.

The SOC 100 may include processing blocks for real-time memory performance, such as the camera 160 and the display controller 162, as described earlier. In addition, the SOC 100 may including processing blocks for non-real-time memory performance for image scaling, rotating, and color space conversion, accelerated video decoding for encoded movies, audio processing and so forth. The media controller 166 is one example. The I/O interface ports 170 may include interfaces well known in the art for one or more of a general-purpose I/O (GPIO), a universal serial bus (USB), a universal asynchronous receiver/transmitter (uART), a FireWire interface, an Ethernet interface, an analog-to-digital converter (ADC), a DAC, and so forth.

Figure 2:
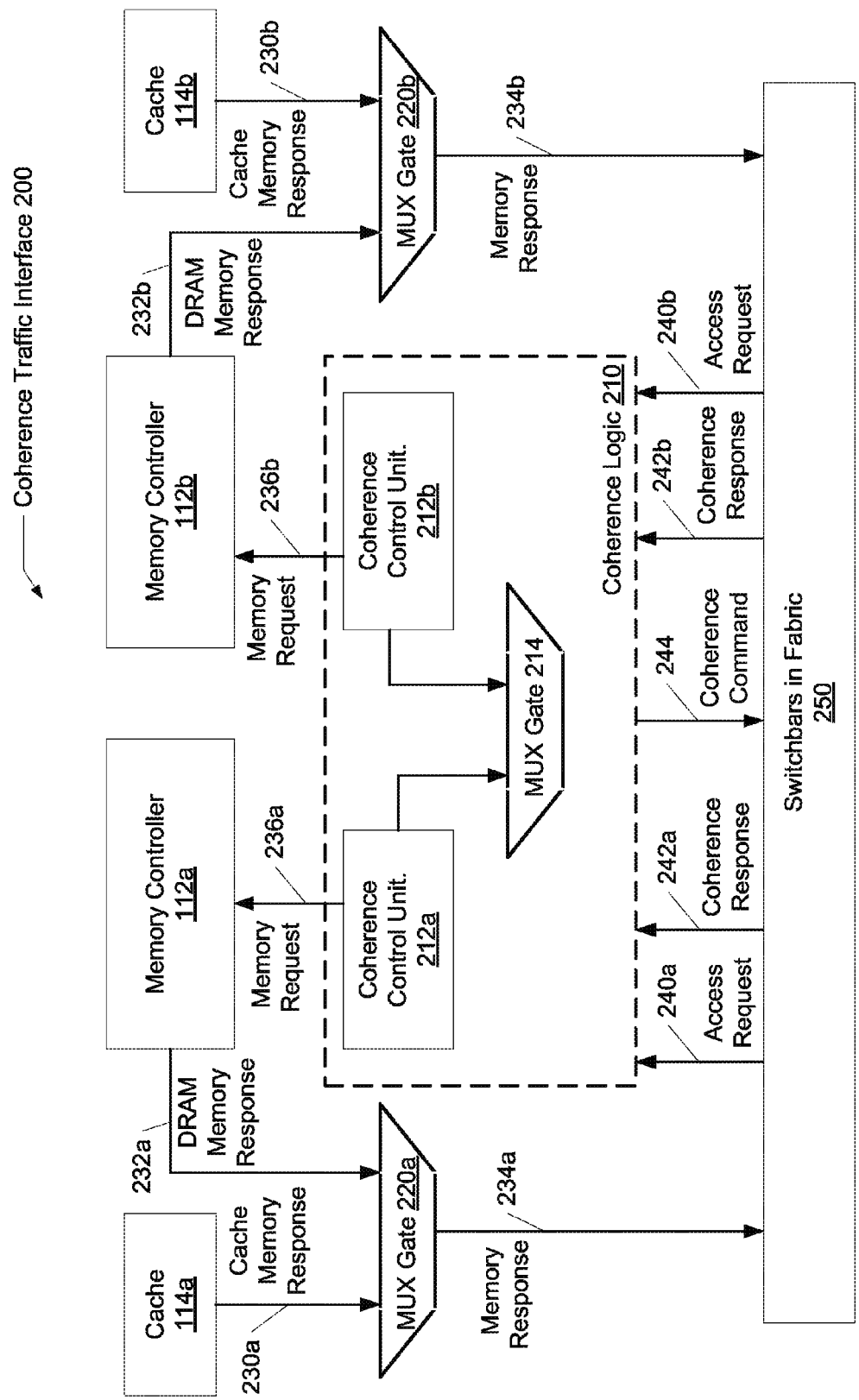
FIG. 2 is a generalized block diagram of one embodiment of a cache coherence traffic interface 200 on a system-on-a-chip (SOC).

Turning now to FIG. 2, a generalized block diagram of one embodiment of a cache coherence traffic interface 200 on a system-on-a-chip (SOC) is shown. Circuitry and logic described earlier are numbered identically. The interface 200 includes the coherence logic 210, which interfaces with at least the memory controllers 112a-112b and the switch bars 230. In some embodiments, the coherence logic 210 and the switch bars 250 are within the fabric 130 on the SOC 100. Here, bus traffic between the switch bars 250 in the fabric on the SOC, coherence logic 210, and memory is shown.

The bus traffic may include coherence commands 244 from the coherence logic 210. The coherence commands 244 are coherence commands sent to the switch bars 250 in the fabric on the SOC rather than to the memory interface that includes the memory controllers 112a-112b and the memory caches 114a-114b. Examples of the coherence commands 244 may include at least a cache-line read-for-ownership command, a cache-line read-for-shared command, a cache-line writeback command, a cache-line upgrade command, and a cache-line invalidation command. Other examples of coherence commands are possible and contemplated. The bus traffic may include coherence command responses 242a-242b from one or more of the multiple IC designs on the SOC that are targeted by the coherence commands 244.

The bus traffic may also include asynchronous memory access requests 240a-240b from the multiple IC designs on the SOC and corresponding memory responses 234a-234b from the memory interface that includes the memory controllers 112a-112b and the memory caches 114a-114b. The coherence logic 210 may include coherence control units 212a-212b for routing traffic between the memory interface and the fabric according to bus classes, such as a left bus and a symmetrical right bus. The mux gate 214 may be used for this type of routing requests, responses, and commands. The memory requests 236a-236b may be requests from the access requests 240a-240b that the coherence logic 210 determines to send to the memory controllers 112a-112b.

The multiplexer gate 220a may select between the DRAM memory response 232a from the memory controller 112a and the cache memory response 230a from the memory cache 114a. Each of the responses 230a-232a may be in response to an earlier one of the received memory access requests 240a-240b from the switch bars 250 in the fabric on the SOC. Similarly, the multiplexer (mux) gate 220b selects between the DRAM memory response 232b from the memory controller 112b and the cache memory response 230b from the memory cache 114b. The selected responses 234a-234b may be sent to the switch bars 250 in the fabric of the SOC.

In various embodiments, the flexible on-die debug resources within the trace unit 116 may monitor buses 234a-234b, 240a-240b, 242a-242b and 244 and store trace history and collect statistics on bus events. The buses 234a-234b, 240a-240b, 242a-242b and 244 may provide a high degree of visibility to the activities occurring on the SOC. One or more of the 234a-234b, 240a-240b, 242a-242b and 244 may be grouped into a class as described earlier. The trace history and the statistics may be collected on a bus basis, on a class basis, or both.

Figure 3:
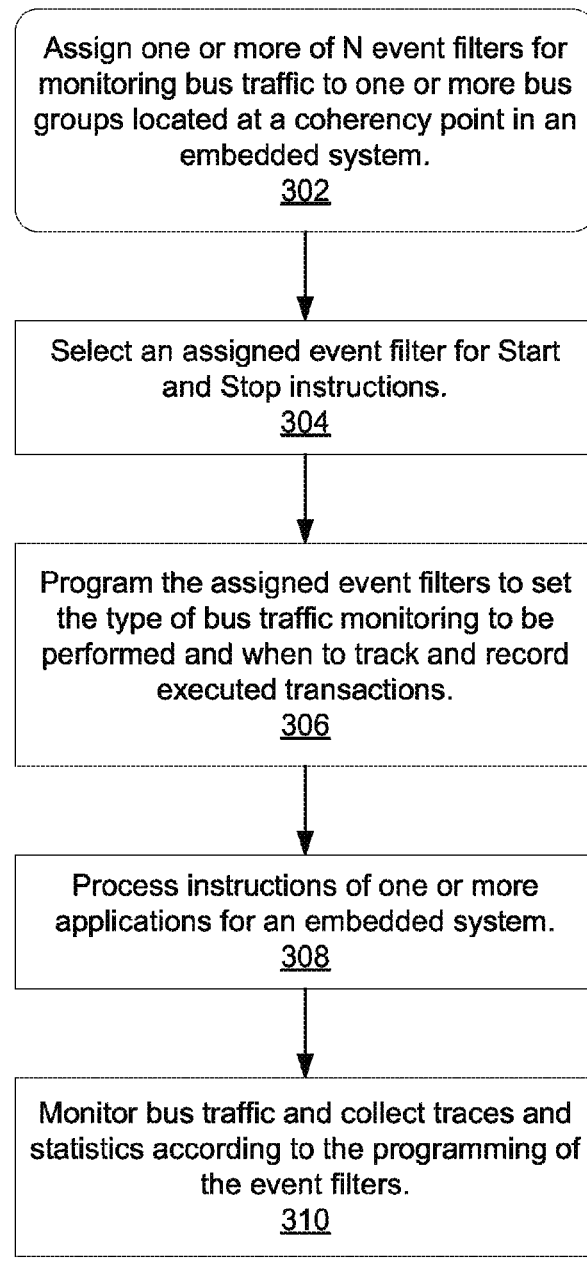
FIG. 3 is a generalized flow diagram of one embodiment of a method for debugging bus activity on a SOC.

Referring now to FIG. 3, a generalized flow diagram illustrating one embodiment of a method 300 for monitoring bus traffic for debugging bus activity on a SOC is shown. For purposes of discussion, the steps in this embodiment are shown in sequential order. However, some steps may occur in a different order than shown, some steps may be performed concurrently, some steps may be combined with other steps, and some steps may be absent in another embodiment.

A trace unit may include programmable on-die debug hardware or resources for collecting trace history and bus event statistics for one or more buses located at a coherence point. The trace unit may include N event filters, where N is an integer. Each event filter may include control logic for determining when valid transactions have occurred on a given bus. The control logic may be connected to programmable control and status registers (CSRs) that store values used for the bus event filtering. The CSRs may also be referred to as configuration registers. The configuration registers may be programmed with trace instructions that are executed in response to the logic within the event filter determines a match between values in bus traffic on the bus or the bus class being monitored and values stored in the configuration registers. One example of a trace instruction is a trace start operation.

In block 302, one or more of the N event filters for monitoring bus traffic is assigned to one or more buses or bus classes located at the coherency point in the computing system. In some embodiments, the computing system is an embedded system. Referring briefly again to FIG. 2, a given event filter may be assigned to bus 244 for monitoring coherence command bus traffic on bus 244. Additionally, another event filter may be assigned to a bus class that includes coherence response buses 242a-242b. Yet another event filter may be assigned to a bus class that includes memory access request bus 240a and memory response bus 234a. Other assignments and groupings of buses are possible and contemplated.

Returning to method 300 in FIG. 3, in block 304, an assigned bus event filter may be selected for beginning a trace collection, a bus event statistics collection, or both. The configuration registers associated with this assigned event filter may be programmed with values that correspond to the types of events and statistics to monitor. Additionally, the selected event filter may have corresponding configuration registers programmed with a trace start instruction. Another event filter may have corresponding configuration registers programmed with a trace stop instruction.

In block 306, one or more other event filters may have their corresponding configuration registers programmed with information indicating the type of bus traffic monitoring to perform and when to record executed transactions. In block 308, instructions of one or more applications are processed. The applications may execute on an embedded system.

In block 310, bus traffic is monitored according to both the assignments and the programming for the N event filters in the trace unit. Traces and bus event statistics are collected according to the assignments and the programming. Trace history information may stored in a trace capture buffer according to the assignments and the type of trace instruction. The bus event statistics, such as qualified bus event counts, may be stored in registers. These registers may be read out both during the collection of the trace history and at a later time after the collection of the trace history. For example, a Joint Test Action Group (JTAG) interface may be used during the debug process to read the bus event counter values. Alternatively, a device driver within the operating system (OS) may utilize a programmable input/output (PIO) access to gather the bus event counts.

Figure 4:
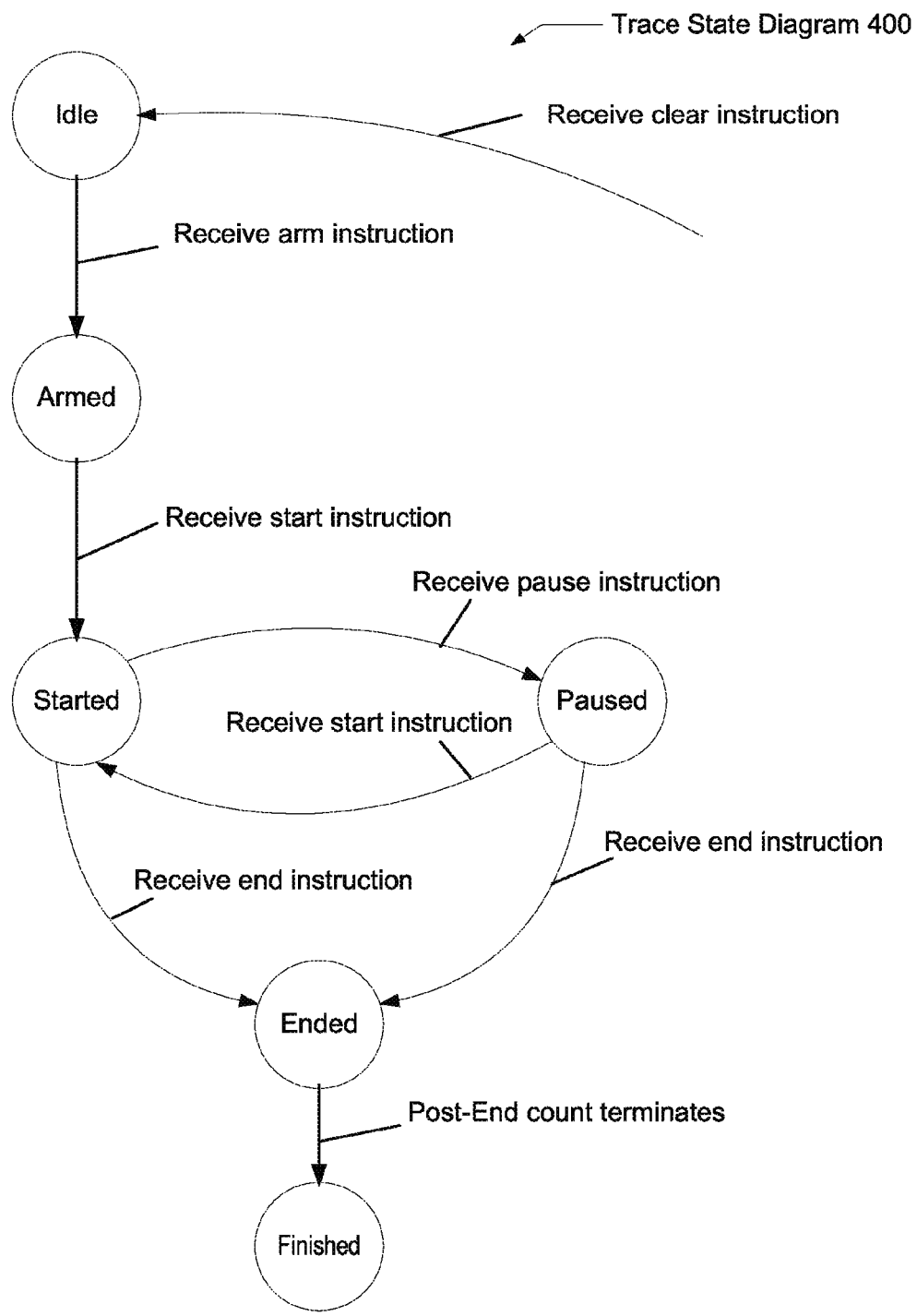
FIG. 4 is a generalized block diagram of one embodiment of a trace state diagram.

Turning now to FIG. 4, a generalized block diagram of one embodiment of a trace state diagram 400 is shown. A trace unit, such as the trace unit 116 in the SOC 100, may use the state diagram 400 for capturing trace history and bus event statistics. In the embodiment shown, the state diagram 400 uses the status states Idle, Armed, Started, Paused, Ended, and Finished. As shown, the state diagram 400 may receive multiple instruction types, such as at least Clear, Arm, Start, Pause, and End.

As described earlier, while monitoring bus traffic on a given bus or buses within a bus class, a given event filter within the trace unit may determine particular qualifying conditions are satisfied, which yields a valid trace instruction to execute and possibly a bus transaction to record. The bus event filter may have corresponding configuration registers programmed with a particular trace instruction. This instruction may be executed in response to determining the qualifying conditions are satisfied. Based on the state diagram and the trace instruction, the trace history may be recorded in trace storage, such as the trace buffer with multiple physical partitions. In addition, bus event counts may be incremented and stored in registers. These registers may be read out both during the collection of the trace history and at a later time after the collection of the trace history. As described earlier, the JTAG interface, a PIO access, or other mechanism may be used to read these registers.

The Clear instruction may clear trace state, pointers, statistics counters and other information. The trace unit may move to an Idle status state in response to the clear instruction being executed. The Arm instruction may be used to put the one or more event filters in the trace unit in an Armed status state. The one or more event filters within the trace unit may be ready to begin filtering bus traffic on assigned buses or bus classes. The Start instruction may place the trace unit in a Started status state and trace history, bus event statistics, or both may be collected. In some embodiments, the trace history information may also be stored in the trace storage in response to both the Started status state and determining qualifying conditions are satisfied. For example, the logic within an event filter may determines a match occurs between values in the bus traffic on the bus or the bus class being monitored and values stored in corresponding configuration registers. In other embodiments, the trace history information may not yet be stored until a Write Bus or similar instruction is executed.

The Pause instruction may place the trace unit in a Paused status state, wherein the capture of traces and bus event statistics may be suspended. The End instruction may place the trace unit in an Ended status state causing the collection of trace history, bus event statistics, or both to stop. Monitoring bus traffic and determining whether valid transactions have occurred through qualifying conditions being satisfied may also occur when entering the Paused and Ended status states.

In addition, entering the Paused and Ended status states may occur either immediately or be delayed. For example, as shown for the Ended state, a post-End count may occur before the trace unit enters a Finished state and trace data collection is actually stopped. After entering the Ended state, a counter may decrement from a programmable value for each clock cycles, such as the clock cycles used in the high-level interconnect, or fabric, of the SOC. In response to the counter decrementing to a reset value, collection of trace information may be done and the state diagram 400 moves from the Ended state to the Finished state. Alternatively, the counter may increment from a reset value to a programmable end value.

A similar counting or delaying mechanism may be used for each of the states in the state diagram 400. Additionally, for the Ended state, in some embodiments, further conditions may be used to stop collection of trace information. For example, even if the counter has not yet reached the reset value when decrementing, if a particular percentage of the trace storage is written after entering the Ended state, then collection may stop. In one example, the percentage may be half of the trace storage.

In some embodiments, the trace storage may be a random access memory (RAM). The trace storage may logically be a single buffer. In some embodiments, the trace storage may be implemented as multiple separate RAMs, wherein each separate RAM may be used to capture trace history and statistics for particular bus events. Alternatively, each separate RAM may be used to capture trace history and statistics for particular buses or bus classes. In some embodiments, the delaying and stopping of actions for a given state in the state diagram 400, such as the Ended state, may be applied to each of the separate RAMs. In other embodiments, the delaying and stopping of actions may be customized for each of the separate RAMs. Similarly, in some embodiments, the states in the state diagram 400 are used for each of the separate RAMs. In other embodiments, more complex control logic may be used and a modified state diagram may be used for one or more of the separate RAMs.

Figure 5:
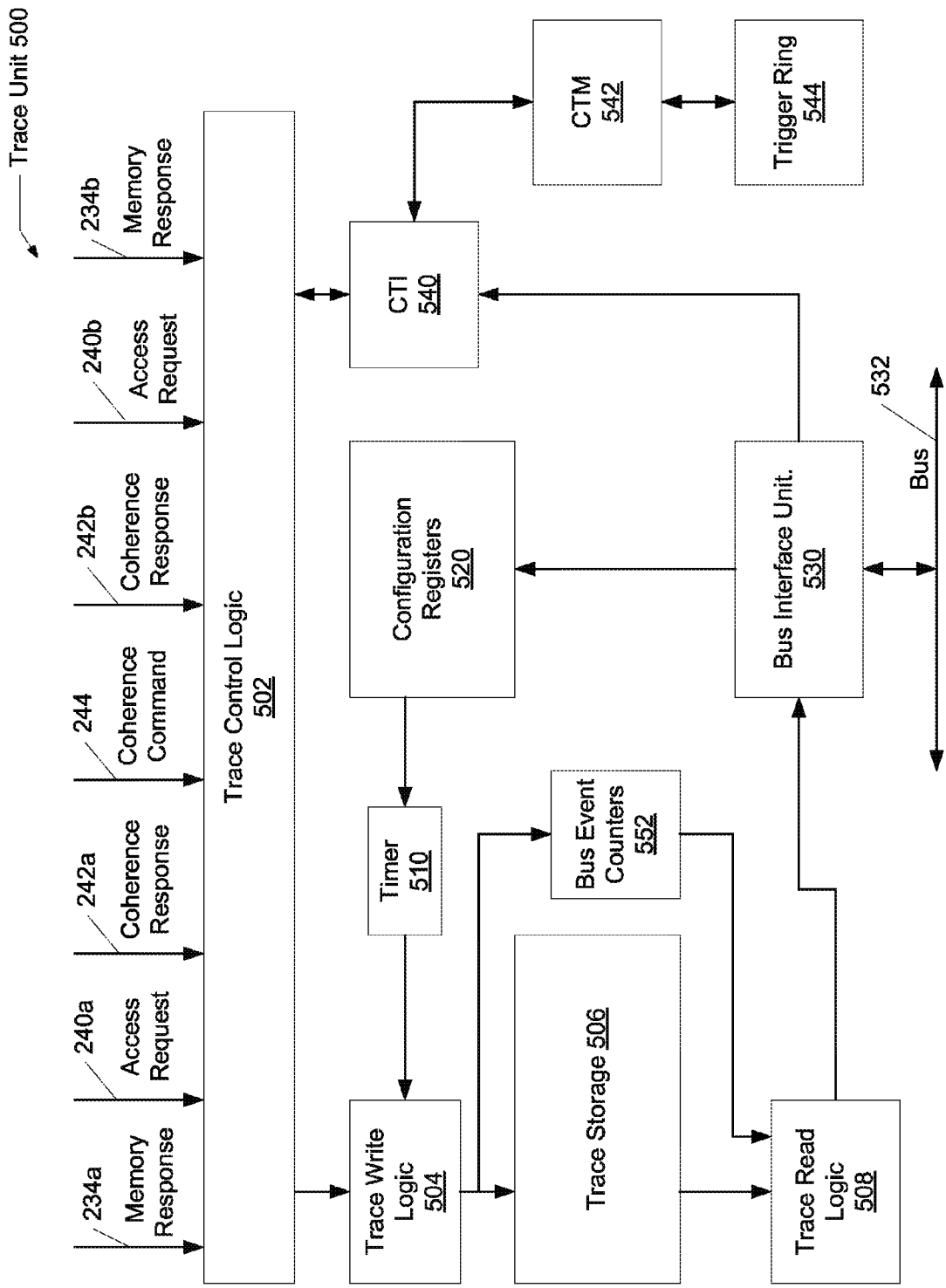
FIG. 5 is a generalized block diagram of one embodiment of a trace unit.

Turning now to FIG. 5, a generalized block diagram of one embodiment of a trace unit 500 is shown. Bus signals described earlier are numbered identically. In one embodiment, the one or more buses being monitored for debugging purposes are sent to the trace control logic 502. In various embodiments, the buses 234a-234b, 240a-240b, 242a-242b, and 244 are sent to the trace control logic 502. The logic 502 may determine when a valid transaction occurs on a given bus and what action to take in response to the determination. In some embodiments, a trace instruction is used to determine the action to take. The valid transactions to track and the taken actions may be determined based on at least the values stored in the configuration registers 520 and the values found in the bus traffic.

The configuration registers 520 may be programmed with values through the bus 532 and the bus interface unit 530. In some embodiments, the bus 532 is the Advanced Peripheral Bus (APB) that is part of the Advanced Microcontroller Bus Architecture (AMBA) provided by ARM Holdings PLC and used as the on-chip bus in system-on-a-chip (SOC) designs. The AMBA protocol is an open standard, on-chip interconnect specification for the connection and management of functional blocks on a SOC.

The trace write logic 504 may be used to send one or more of trace history, a global time-base count, and local timestamps to the trace storage 506 in response to the trace logic 502 detects a valid transaction on a given bus and the state diagram, such as the state diagram 400 in FIG. 4, for the trace unit 500 is in a state that performs updates. For example, a Write Bus or other storage operation may have been executed after the Started trace instruction has been executed. The timer 510 may be used to enable the write transactions into the trace storage 506, such as qualifying write word line drivers. In addition, the timer 510 may include logic to create the global time-base count and the local timestamp. The global time-base count may be written as a last entry in the trace storage 506 when tracing ends. The local timestamp may measure a time duration from the last most-recent update stored in an entry in the trace storage 506. In addition, the trace write logic 504 may be used to send an indication to the bus event counters 552 for updating one or more bus event counters associated with the qualified bus events determined by the bus control logic 502.

In some embodiments, the trace storage 506 may be a random access memory (RAM). The trace storage 506 may logically be a single buffer. In some embodiments, the trace storage 506 may be implemented as multiple separate RAMs, wherein each separate RAM may be used to capture trace history. Alternatively, each separate RAM may be used to capture trace history for particular buses or bus classes. In other embodiments, the trace storage may be an off-chip logic analyzer or an off-chip trace port analyzer.

In addition, left and right buses may or may not be used for traffic flow and the amount of information stored in a particular entry of the trace storage 506 may be accordingly adjusted. Further, the trace control logic 502 and the trace write logic 504 may determine a qualified update for the trace storage 506 may not occur. However, a qualified update for the bus event counters 552 may occur. Bus event statistics alone may be updated with no updates for the trace history.

In various embodiments, the bus event counters may store bus event counts over a much larger time period than the trace storage 506 stores trace history. For example, the trace storage 506 may include hundreds of entries for storing trace history. Each of the bus event counters may include 24-bit registers capable of storing over 16 million counts of bus events. The available entries within the trace storage 506 may fill far sooner than the bus event counters reach a maximum count value. Therefore, after storage of the trace histories ends, the bus event counts may still continue to be stored for a long time period.

A trace instruction may be used to determine what action to take regarding collecting traces when particular qualifying conditions are satisfied for a bus event on a given bus. The trace control logic 502 may utilize the state diagram 400 and may receive multiple instruction types, such as at least Clear, Arm, Start, Pause, and End. One action is to write a trace, bus event statistics, or both into the trace storage 506, thereby, utilizing the trace write logic 504, the timer 510, and the trace storage 506.

In addition, time-base values may be written into the time storage 506 during any write operations for the trace storage 506. Write operations may occur during the Started state and also during the delays for other states, such as the Ended state. Whether the trace storage 506 is implemented as a single buffer or as multiple separate buffers, a pointer may be maintained to indicate the last row in a buffer written with valid trace information. Another pointer may be maintained to indicate the first row written with valid trace information. The pointers may be used to determine whether recording of the trace information stopped before the buffer filled or the recordings wrapped around the buffer. The pointer positions may be used when the trace information is read out to reassemble the trace information. The trace read logic 508 may be used to read out trace information from the trace storage 506 for debugging purposes. The read out information may be sent to the bus 532 through the bus interface unit 530.

In addition to the two above pointers, two additional pointers may be used for the locations of the first entries to be updated after the Start and End instructions. A time counter may be used to track the elapsed time between trace information updates in the entries of the trace storage 506. If separate buffers are used, then separate time counters may also be used. In some embodiments, the time counter may clear after an update of an entry of a corresponding buffer and increment at each clock cycle of the high-level interconnect of the SOC, or the fabric. In addition, time stamps maybe stored in the entries of the buffers.

In various embodiments, the trace unit 500 includes testing logic and interfaces for external agents. For example, cross-trigger mechanisms are typically used during debugging of multiple embedded cores, such as the multiple IC devices on a SOC. The cross-trigger mechanism triggers activities in one debug entity from debug events occurring in another debug entity. The cross-triggers may be related to certain inter-core transactions or bus traffic transactions. The cross-trigger mechanism typically uses a trigger source that generates a trigger event when certain conditions are fulfilled and a trigger target that performs debug actions. Additionally, the cross-trigger mechanism uses a trigger event delivery mechanism to send the trigger event from the trigger source to the trigger target. Dedicated interconnects transfer the debug events.

One example of a cross-trigger mechanism is the ARM® CoreSight debug architecture that includes one or more cross-trigger interface (CTI) blocks and a cross-trigger matrix (CTM). In various embodiments, the trace unit 500 may use this architecture for additional debugging purposes. The CTI 540 combines and maps trigger requests from an embedded core or an associated embedded trace module (ETM). The CTI 540 also broadcasts these requests to other CTI blocks. The CTM 542 may include interconnects for connecting multiple CTIs together and other debug sites. The trigger ring 544 represents the other multiple CTIs and the other debug sites. In this manner, the debug architecture passes trigger events from one embedded core to another. The trigger ring 544 may be handled by the trace control logic 502 as another event filter capable of determining valid bus transactions and in response to this determination providing an action to take.

Figure 6:
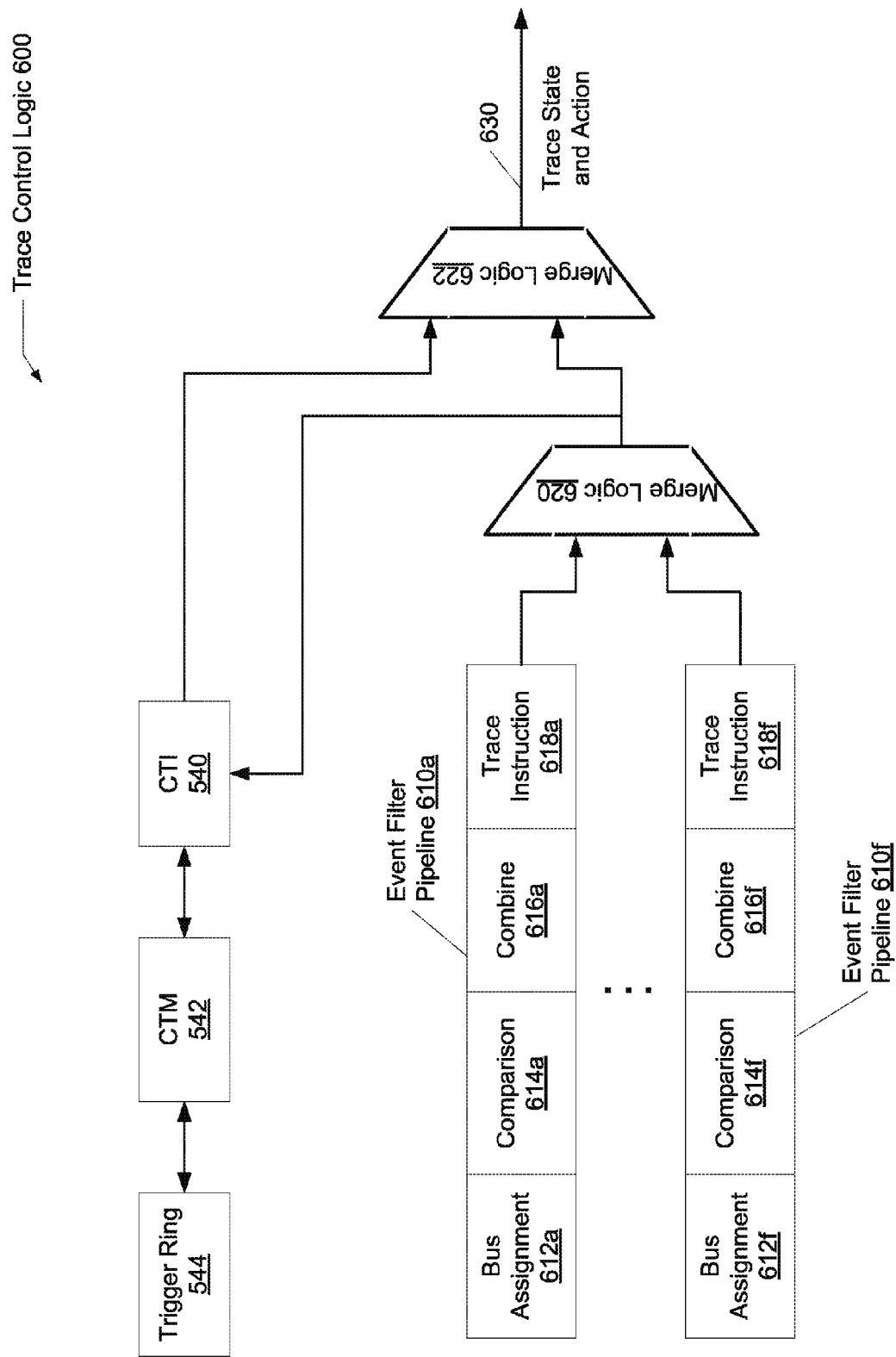
FIG. 6 is a generalized block diagram of one embodiment of trace control logic.

Turning now to FIG. 6, a generalized block diagram of one embodiment of trace control logic 600 is shown. Circuitry and logic described earlier are numbered identically. In various embodiments, the trace unit may include one or more bus event filter pipelines such as pipelines 610a-610f for controlling the collection of trace history and statistics at a coherence point in the design of an integrated circuit. In various embodiments, the bus event filter pipelines 610a-610f process data in bus traffic in multiple clock cycles. In other embodiments, the bus event filter pipelines 610a-610f process data in bus traffic in a single clock cycle. The bus event filter pipelines 610a-610f may also be referred to as bus event filters 610a-610f. In some embodiments, the integrated circuit is a system-on-a-chip (SOC). The pipelines 610a-610f may be configurable through programmable configuration registers. A given one of the event filter pipelines, such as pipeline 610a, may have a bus assignment stage 612a, a comparison stage 614a, a combine stage 616a, and a trace instruction 618a. Similarly, the event filter pipeline 610f includes stages 612f-618f.

The assignment stage 612a may be used to assign the event filter pipeline 610a to a particular bus or bus class. Referring again to FIG. 5, in one embodiment, the buses 234a-234b, 240a-240b, 242a-242b, and 244 are sent to the trace control logic 502. One or more of these buses may be combined in a bus class. The trace control logic 600 may illustrate one embodiment of the control logic used for the received bus traffic on the buses 234a-234b, 240a-240b, 242a-242b, and 244. Programming the configuration registers may be done to set the assignment for one or more of the event filter pipelines 610a-610f. Each one of the event filters 610a-610f may be assigned to any bus class, including multiple event filters assigned to a single bus class. However, any given one of the event filters 610a-610f may not be assigned to multiple bus classes.

Programming the configuration registers may set the values that are compared against in the comparison stage 614a and the combination formulas to use in the combine stage 616a. Additionally, the trace instruction type for the event filter pipeline may be set by programming the configuration registers. Taking the event filter pipeline 610a as an example, in response to qualified conditions are found to be satisfied in the comparison stage 614a and the combine stage 616a, one or more qualified bus events for the event filter pipeline 610a have an associated trace instruction type stored in the trace instruction stage 618a. As described earlier, examples of the trace instruction may include Clear, Arm, Start, Pause, and End. These instructions may also be referred to as Clear Capture, Arm Capture, Start Capture, Pause Capture, and End Capture, wherein "Capture" may refer to capturing or collecting trace history and/or statistics. Further, a Write Bus instruction may be used to indicate the collected information may be sent to the trace storage for recording. Other instruction types are possible and contemplated.

The trace instruction associated with the qualified bus events may be sent to the merge logic 620. Since multiple event filter pipelines may simultaneously send trace instructions in a same clock cycle to the merge logic 620, the merge logic 620 uses priority logic to determine which received trace instruction is selected for execution. In various embodiments, the End instruction may have the highest priority followed by the Pause instruction and the Start instruction. In some embodiments, only one instruction is executed in a given clock cycle. In other embodiments, one instruction per bus class and per separate trace RAM may be executed in a given clock cycle. Other partitions may be used for simultaneously executing multiple trace instructions. Additionally, the Write Bus trace instruction may also be executed simultaneously with the End, Pause, and Start instructions.

Trace instructions may also come through the CTI block 540 via the trigger ring 544 and the CTM block 542. In various embodiments, the trace instruction types that come through the CTI block 542 are the same instruction types that may come from the event filter pipelines 610a-610f. Trace instructions may travel both in and out through the CTI block 542. The merge logic 622 selects between the trace instruction at the output of the merge logic 620 and the trace instruction from the CTI block 540. Again, a priority scheme may be used in the merge logic 622. In some embodiments, the trace instructions that are not selected may be buffered for execution in later clock cycles.

The bus traffic may include particular fields used in the comparison stage, such as stage 614a of the event filter pipeline 610a. Some examples of the monitored fields may include an IC device identifier (ID), a thread identifier (TID), an address, a trust zone mapping, and a coherence command. The trust zone mapping may define multiple separate address ranges defined by programmable configuration registers. The address ranges may correspond to different IC designs on the SOC. The mappings may have an arbitrary size and are located on any arbitrary page aligned boundary as defined by base and size registers. After initialization by boot firmware, particular configuration registers corresponding to the trust zone mappings may define regions in the off-chip DRAM that are only accessible by transactions with the respective trust zone mapping value.

Other examples of fields to monitor and compare against stored values in configuration registers are possible and contemplated. Fields such as the address and trust zone mappings may have absolute values. Fields such as the ID and TID may have encoded values.

Fields such as the coherence command field may be fully enumerated. The coherence command field may be expanded to be an un-encoded single bit per command. Each bit position may be associated with a given coherence command. For example, a multi-bit vector may be used, wherein bit position 1 of the vector corresponds to a cache line read for ownership coherence command. Bit position 5 of the vector may correspond to a cache line read for shared coherence command, bit position 21 may correspond to a cache line invalidation coherence command, and so forth. To track a particular coherence command, in some embodiments, the associated bit position is asserted in the corresponding configuration register. Simultaneously monitoring multiple coherence commands may be allowed. Simultaneously monitoring multiple commands may be performed by setting multiple bits within the enumerated vector. If the bus traffic being monitored has a coherence command that matches any of the coherence commands indicated in the enumerated vector, then the comparison may result in a match.

The particular fields, such as the ID, TID, address, trust zone mapping, and coherence commands, to use for comparisons may additionally depend on the bus type being monitored and other qualifying values, such as a valid or enabled bit. Unqualified fields may be treated as a don't-care value in Boolean logic. The field positions within the bus traffic may be known and used for the comparisons. For example, for each of the buses, a first field position may be the TID field and it is compared to a TID value stored in the configuration registers. For each of the buses, the second field position may be the ID field and it is compared to an ID value stored in the configuration registers.

For particular bus types, such as the access request buses 240a-240b and the coherence command bus 244, the third field position may be a concatenation of the trust zone mapping and the address fields. The concatenated values may be compared to concatenated values stored in the configuration registers. For other bus types, such as the coherence response buses 242a-242b and the memory response buses 234a-234b, the concatenated values in third field position may have a corresponding enabled bit deasserted. In addition, the third field position may be filled with logic zeroes or another given logic value.

Each of the bus field positions and other qualifying information such as enable or valid bits may be compared to corresponding values stored in the configuration registers with a single bit result to indicate a matching bus event. For bus classes, each bus within the class may be monitored for a given bus event and if any one of the buses within the class has a match for the bus event, then a valid bus event has occurred and the result is sent to the combine stage of the event filter pipeline.

Table 2 below illustrates one embodiment of representing the bus fields and positions used for comparing against values stored in configuration registers in the compare stage within an event filter pipeline. For bus traffic on the access request buses 240a-240b and the coherence command bus 244, the third field position may be a concatenation of the trust zone mapping and the address fields. Comparisons for the coherence command on the bus traffic of any bus may not use enable or valid bits, since the coherence command field is enumerated.

TABLE 2

Bus Traffic Comparison Monitoring

| Field Position [i] | Bus Field [i] |
|---|---|
| 3 | {Trust Zone, Address} |
| 2 | IC Source ID |
| 1 | Thread ID |
| 0 | Enumerated Coherence Command |

Following the comparison stage is the combine stage, such as the combine stage 616a for the event filter pipeline 610a. The combine stage provides flexibility for determining which bus events or combinations of bus events cause a trace history to be stored, which bus event statistics to update, or both. Programming a given configuration register may change a formula for determining the combinations. For example, a combiner configuration register may include a multi-bit vector, wherein a set of bits may correspond to multiple bus fields within bus traffic on an associated bus. The stored values in the combiner configuration register may be sent to combinatorial logic that implements formulas for defining the valid combinations of bus events.

Storing asserted and deasserted values in the different bit positions of the combiner configuration register in a particular manner may change the formulas for defining the valid combinations of bus events. Table 3 below illustrates one embodiment of representing bus event combining formulas in a combiner configuration register. In some embodiments, the number of bits in the combiner configuration register may be proportional to at least a number of fields to monitor and compare on the buses, whether inverted values of matches are used, and a number of functions to use in the formulas. For example, in Table 3, 4 fields are monitored and compared on the buses, inverted match values are used (2 values are used), and 2 Boolean functions (AND, OR) are used, which yields 16 bits for the combiner configuration register, or 4×2×2=16.

TABLE 3

Bus Event Combining Formulas

| Function | Combiner Configuration Register Bit | Compare Result Register Bit | Matching Result Polarity | Description |
|---|---|---|---|---|
| AND | 15 | 3 | Inverted | For every set register bit, the condition must be true. If any condition is not true for any set bit, then the AND function result is not true. |
|  | 14 | 2 |  |  |
|  | 13 | 1 |  |  |
|  | 12 | 0 |  |  |
|  | 11 | 3 | Non-Inverted |  |
|  | 10 | 2 |  |  |
|  | 9 | 1 |  |  |
|  | 8 | 0 |  |  |
| OR | 7 | 3 | Inverted | For at least one set register bit, a condition must be true. If all conditions are not true for the set bits, then the OR function result is not true. |
|  | 6 | 2 |  |  |
|  | 5 | 1 |  |  |
|  | 4 | 0 |  |  |
|  | 3 | 3 | Non-Inverted |  |
|  | 2 | 2 |  |  |
|  | 1 | 1 |  |  |
|  | 0 | 0 |  |  |

The four bits in the Compare Result Register in the third column of Table 3 may correspond to the four field positions shown in Table 2. The bit position 0 of the Compare Result Register may correspond to a match value associated with the field position 0 holding the enumerated coherence command. The match value may be found by comparing the enumerated coherence command vector stored in a configuration register with the enumerated coherence command vector in the field within the bus traffic being monitored. Similarly, the bit position 1 of the Compare Result Register may correspond to a match value associated with the field position 1 holding the thread ID, and so forth. The match values may be found during the compare stage of the event filter pipelines. The selection of which bits within the combiner configuration register to assert and the type of combinatorial logic that receives the combiner configuration register outputs may determine the formulas used for filtering the bus events occurring on the bus traffic at the coherence point on the SOC. Alternatively, the formulas may filter the bus events occurring on another global ordering point of an integrated circuit design. For example, storing a deasserted value in bits 15, 11, 7, and 3 of the combiner configuration register may remove the concatenated field 3 (trust zone, address) from being a qualified match during bus event filtering.

Examples of Boolean formulas to use with the compare result register and the combiner configuration register are shown in the following:

Field_Combiner_In [15:0] = {~Field_Compare_Results [3:0] &

Field_Combiner_Config[15:12], Field_Combiner_Results [3:0] &

Field_Combiner_Config[11:8], ~Field_Compare_Results [3:0] &

Field_Combiner_Config[7:4], Field_Compare_Results [3:0] &

Field_Combiner_Config[3:0]}

Combiner_AND =

((Field_Combiner_In [15:8] == Field_Combiner_Config[15:8]) &

(Field_Combiner_In [15:8] != 8'h0))

Combiner_OR = (Field_Combiner_In [15:8] != 8'h0)

Combiner_Final = (Combiner_AND[7:0] | Combiner_OR[7:0])

As seen in the above, in some embodiments, the final event filtering result is asserted if each of the Boolean AND conditions is satisfied (true) or if any of the Boolean OR conditions is satisfied (true). The final event filtering result may be output after the comparison stage and the combiner stage in the event filter pipeline. An asserted final result may cause the stored trace instruction to be sent as a valid input to the merge logic 620. Again, if multiple valid trace instructions are sent to the merge logic 620, a priority scheme may be used to determine which trace instruction is executed. The trace state and action 630 are output from the merge logic 622. Although the Boolean AND and OR operations are used in the above formulas, other Boolean operations and other methods to combine the match results for bus event filtering are possible and contemplated.

Figure 7:
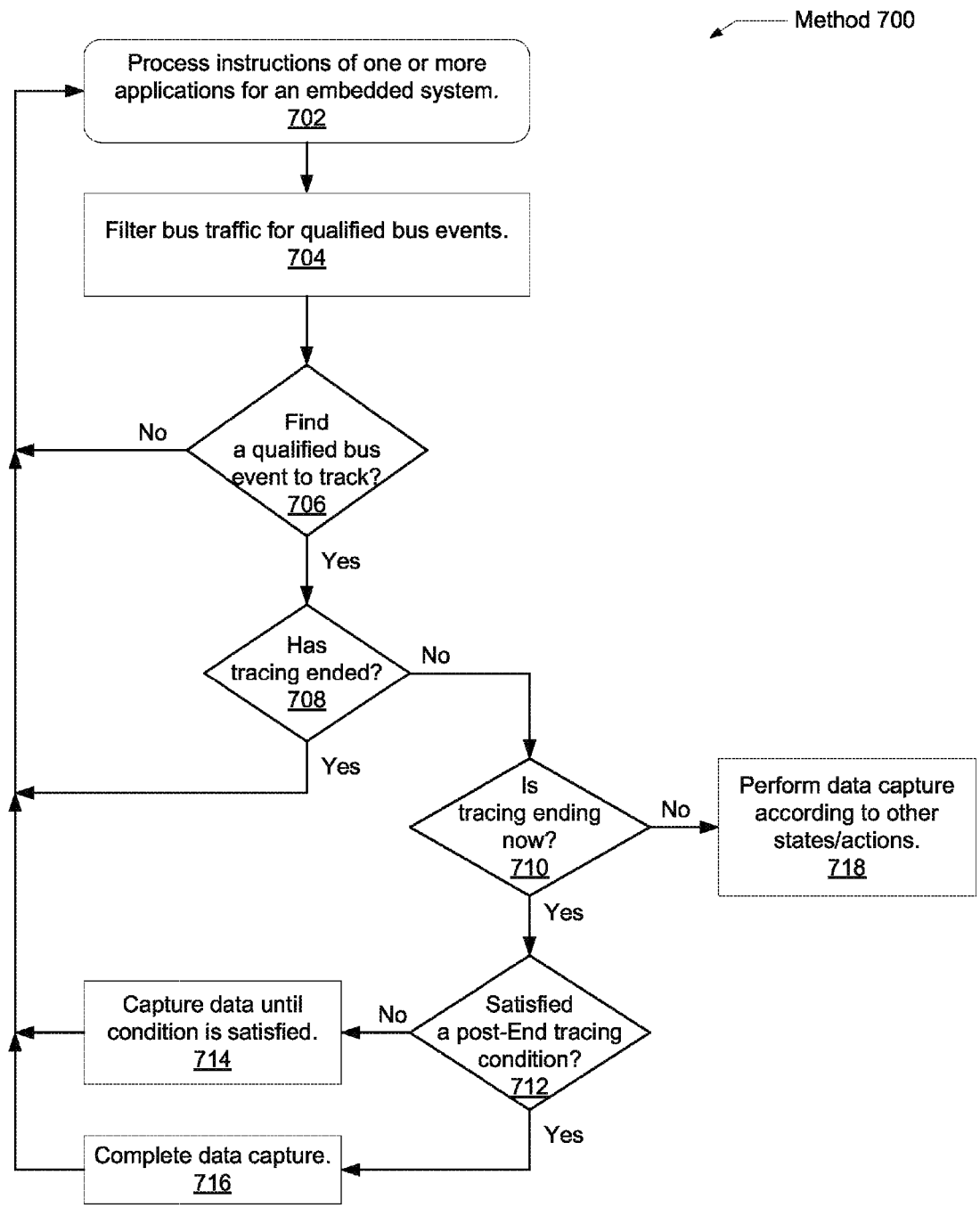
FIG. 7 is a generalized flow diagram of one embodiment of a method for monitoring bus traffic for debugging bus activity on an integrated circuit.

Referring now to FIG. 7, a generalized flow diagram illustrating one embodiment of a method 700 for monitoring bus traffic for debugging bus activity on an integrated circuit is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 702, an integrated circuit process instructions of one or more applications. In various embodiments, the integrated circuit is an embedded system, such as a system-on-a-chip (SOC). In block 704, selected bus traffic may be filtered for qualified bus events. The bus traffic at a global ordering point on the chip, such as a coherence point, may be selected. The bus traffic may be monitored, such as by the bus event filters described earlier. The bus event filters may have been previously assigned to a particular bus or bus class. Comparisons and filtering logic may be used to determine whether qualified bus events have occurred. For example, the two-stage process described earlier regarding the compare stage and the combiner stage of the event filter pipeline may be used.

If a qualified bus event to track is found with the filtering process (conditional block 706) and tracing has not ended (conditional block 708), then the tracing may be ending now or trace information may be in a state of being collected and stored. An End Capture instruction may be received by the trace control logic in the trace unit. If the tracing is ending now (conditional block 710) and post-End tracing condition is satisfied (conditional block 712), then in block 716, the collection and the storage of the trace information may end. In some embodiments, the post-End tracing condition may be a counter that decrements from a programmed value or increments to the programmed value.

If the post-End condition is not satisfied (conditional block 712), then in block 714, trace history and statistics may be captured and stored until the post-End condition is satisfied. If the tracing is not ending now (conditional block 710), then in block 718, trace history and statistics may be collected and stored according to the states and actions of a trace state diagram in trace control logic within a trace unit. The state diagram described earlier may be used. Further details of the trace capture steps are provided below in methods 800 and 900.

Figure 8:
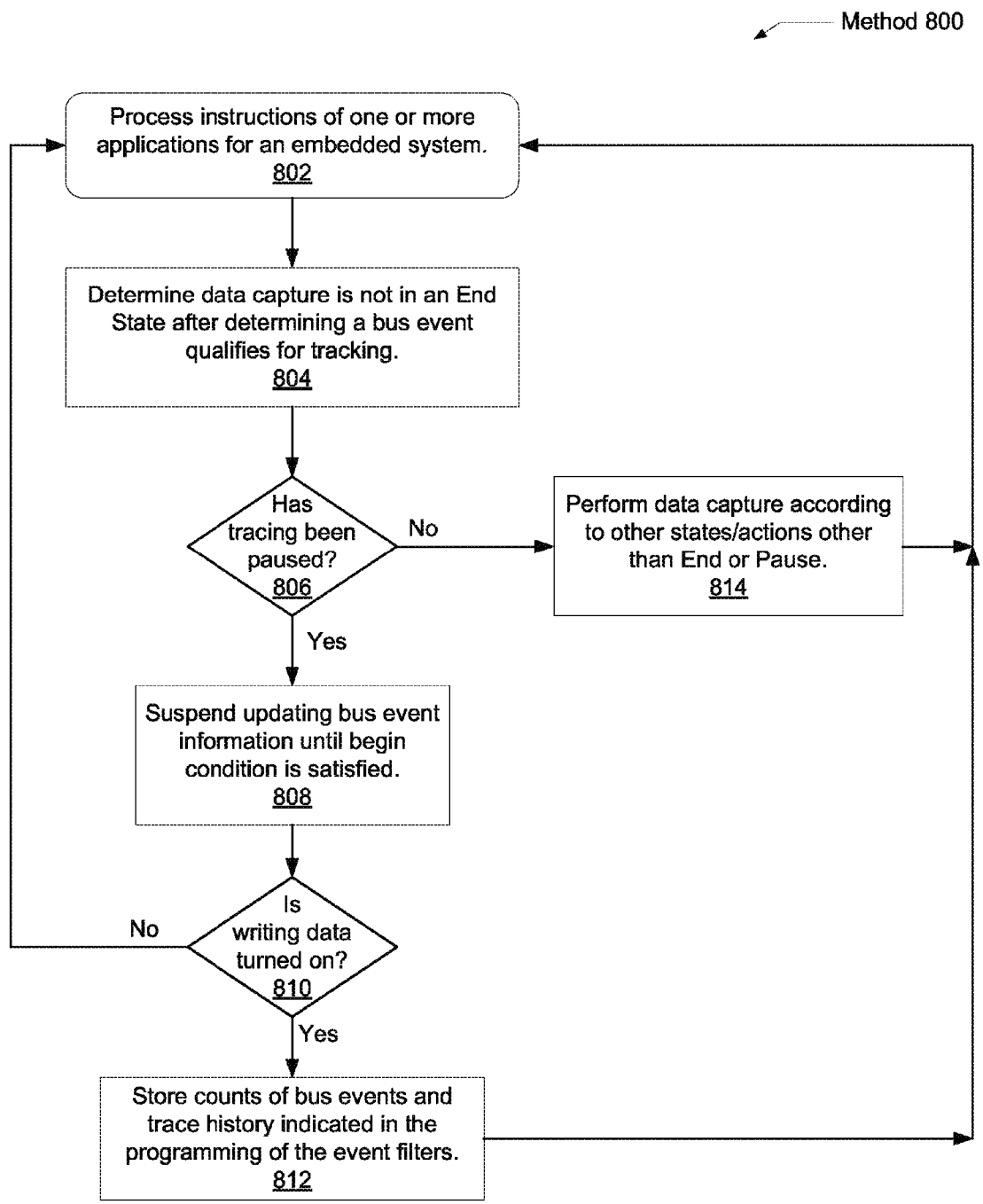
FIG. 8 is a generalized flow diagram of one embodiment of a method for suspending trace capture while monitoring bus traffic for debugging bus activity on an integrated circuit.

Referring now to FIG. 8, a generalized flow diagram illustrating one embodiment of a method 800 for suspending trace capture while monitoring bus traffic for debugging bus activity on an integrated circuit is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 802, an integrated circuit processes instructions of one or more applications. In various embodiments, the integrated circuit is an embedded system, such as a system-on-a-chip (SOC). In block 804, after determining a bus event qualifies for tracking, the trace control logic may determine the collection and storage of trace information is not in an End state. The End state may cause the collection and storage to end immediately or end after a programmable amount of time.

If the collection and/or storage of trace information, such as trace history and statistics, has been paused or suspended (conditional block 806), then in block 808, at least the storing of trace history and statistics may be halted until a begin condition is satisfied. In some embodiments, the one or more counters used to track particular bus events may additionally halt the counting the detected bus events. In other embodiments, the counters continue tracking bus event statistics, but the trace buffer is not updated with the new information until the begin condition is satisfied. In various embodiments, while a trace is paused, values in the programmable configuration registers may be updated.

If a bus write condition is satisfied (conditional block 810), such as a write bus trace instruction has been previously executed, then in block 812, the trace buffer may be updated with the current trace history and/or statistics corresponding to bus events that are both indicated in the programming of the event filters and detected in the bus traffic. In some embodiments, the update of the trace buffer may occur only once after the Pause trace instruction is executed.

If the collection and/or storage of trace information has not been paused or suspended (conditional block 806), then in block 814, the trace history and statistics may be collected and stored according to the states and actions of a trace state diagram in trace control logic within a trace unit. The state diagram described earlier may be used. Further details of the trace capture steps are provided below in method 900.

Figure 9:
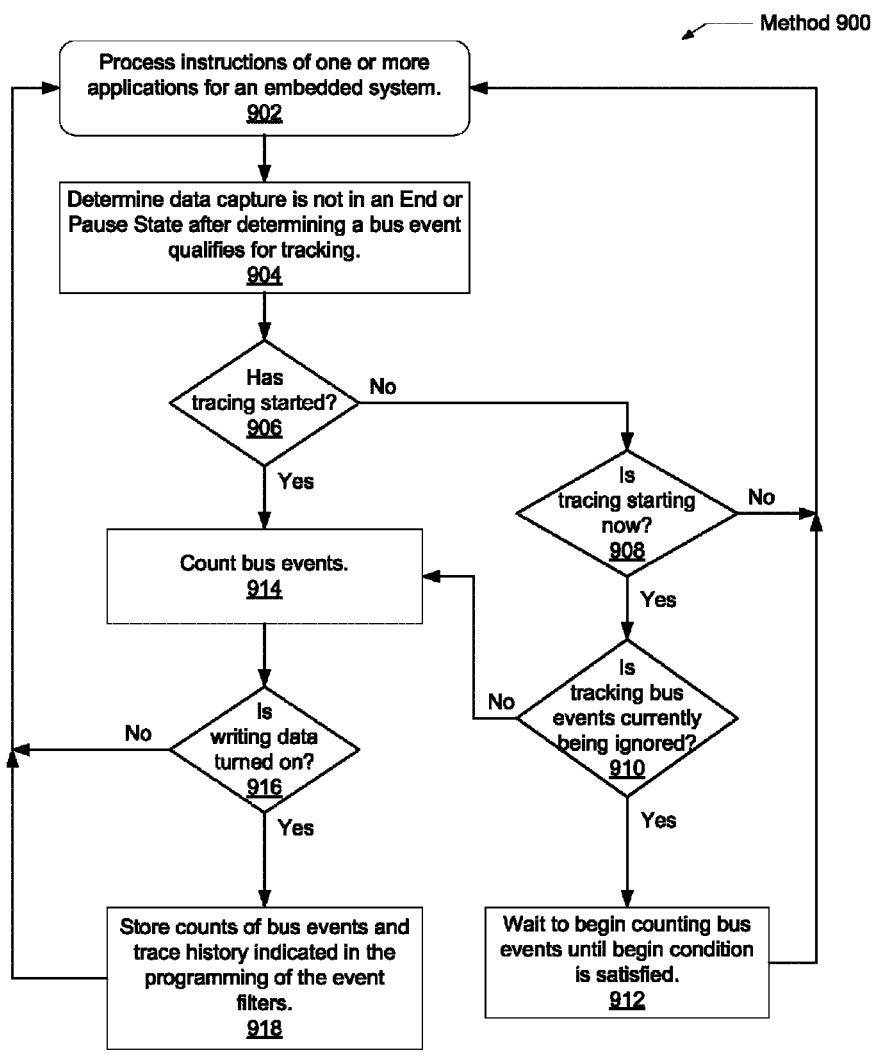

Referring now to FIG. 9, a generalized flow diagram illustrating one embodiment of a method 900 for beginning trace capture for debugging bus activity on an integrated circuit is shown. Similar to methods 300, 700, and 800, the steps in this embodiment are shown in sequential order. However, some steps may occur in a different order than shown, some steps may be performed concurrently, some steps may be combined with other steps, and some steps may be absent in another embodiment.

In block 902, an integrated circuit processes instructions of one or more applications. In various embodiments, the integrated circuit is an embedded system, such as a system-on-a-chip (SOC). In block 904, after determining a bus event qualifies for tracking, the trace control logic may determine the collection and storage of trace information is not in an End or Pause state. Associated bus event statistics may be updated. For example, associated counts may be incremented. The statistics update may occur regardless of whether a trace is recorded in the trace storage.

If the collection and/or storage of trace information has not yet been started (conditional block 906), but tracing is starting now due to a trace start instruction is received by trace control logic (conditional block 908), then a determination is made whether to delay tracing according to a programmable time duration. There may be bus events to ignore after certain conditions such as a system reset. After entering the Started state, a counter may decrement from a programmable value for each clock cycles, such as the clock cycles used in the high-level interconnect, or fabric, of the SOC. In response to the counter decrementing to a reset value, collection of trace information may begin. Alternatively, the counter may increment from a reset value to a programmable end value. In some embodiments, the programmable delay is not used for external debug agent bus events, such as CTI bus events.

If tracking bus events is currently being ignored (conditional block 910), then in block 912, the counting and maintaining of statistics regarding bus events on monitored buses or bus classes is delayed until a begin condition is satisfied. The begin condition may be a programmable time duration is reached. If tracking bus events is not currently being ignored (conditional block 910), then control flow of method 900 moves to block 914. Similarly, if tracing had previously started (conditional block 906), then control flow of method 900 moves to block 914.

In block 914, bus events may be monitored and counted. In various embodiments, both non-filtered and qualified filtered bus events may be tracked in case the programming of the event filters changes during tracing. In other embodiments, programming of the event filters may occur prior starting tracing and the programming is available for change until tracing has ended and finished. In these cases, the non-filtered bus events may not be counted or have any statistics maintained.

If a bus write condition is satisfied (conditional block 916), such as a write bus trace instruction has been previously executed, then in block 918, the trace buffer may be updated with the current trace history corresponding to bus events that are both indicated in the programming of the event filters and detected in the bus traffic. Additionally, the trace information may be written for each bus or bus class with a corresponding asserted valid bit indicating the bus or bus class had bus activity during the clock cycle of the trace capture.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A semiconductor chip comprising:
   a shared memory;
   a plurality of functional blocks, each configured to access the shared memory;
   a cache coherence controller configured to provide to the functional blocks a consistent data value for a given data block in the shared memory;
   a plurality of buses configured to transfer coherent messages between the shared memory and the cache coherence controller; and
   a programmable trace unit comprising circuitry configured to:
      select at least a first bus and a second bus of the plurality of buses to monitor bus traffic;
      select from a plurality of bus events a first qualified bus event to detect on the first bus, wherein the first qualified bus event comprises a first cache coherent command;
      select from the plurality of bus events a second qualified bus event to detect on the second bus, wherein the second qualified bus event comprises a second cache coherent command different from the first cache coherent command;
      select a respective trace instruction of a plurality of trace instructions for each of the first bus and the second bus; and
      in response to detecting the first qualified bus event on the first bus or the second qualified bus event on the second bus, execute the respective selected trace instruction.

2. The semiconductor chip as recited in claim 1, wherein in response to finding one or more of the first qualified bus event and the second qualified bus event, the trace unit is further configured to increment an associated count for each of the first qualified bus event and the second bus event.

3. The semiconductor chip as recited in claim 2, wherein one or more of the plurality of trace instructions cause at least one of the following to be stored in a trace capture buffer: a trace history and trace statistics comprising at least the associated counts.

4. The semiconductor chip as recited in claim 1, wherein the trace unit is further configured to select two or more buses of the plurality of buses to group into a bus class for monitoring bus traffic for the bus class, wherein each of the selected two or more buses in the bus class has a same bus traffic type, a same bus traffic direction, or a same on-die location.

5. The semiconductor chip as recited in claim 4, wherein in response to finding one or more qualified bus events on any of the buses within the bus class, the trace unit is further configured to increment an associated count at a bus class level for each of the one or more qualified bus events, wherein the qualified bus events may be a same event or a different event for each of the buses within the bus class.

6. The semiconductor chip as recited in claim 1, wherein a given bus event of the one or more qualified bus events comprises at least a match between a first identifier (ID) of a cache coherent command on a given bus of the selected one or more buses and a second ID of a cache coherent command stored in the programmable configuration registers.

7. The semiconductor chip as recited in claim 1, wherein a given bus event comprises at least a match of one of the following values between values on a given bus of the selected one or more buses and values stored in programmable configuration registers: a functional block ID, a thread ID, a trust zone mapping, and a memory address.

8. The semiconductor chip as recited in claim 7, wherein at least one qualified bus event further comprises an asserted result of a Boolean combination of match results corresponding to values appearing on the given bus.

9. The semiconductor chip as recited in claim 1, wherein the trace unit further comprises a plurality of bus event filters, wherein each is configured to:
   store assignment information corresponding to a given bus of the plurality of buses, wherein the given bus is a different bus than a previously assigned bus of the plurality of buses to an associated bus event filter;
   monitor the given bus; and
   in response to finding one or more of the qualified bus events on the given bus, convey an associated trace instruction to be executed.

10. The semiconductor chip as recited in claim 4, wherein in response to determining two trace instructions are available to execute at a given time, the trace unit is further configured to:
   in response to determining the two trace instructions are from different bus classes, concurrently execute the two trace instructions; and
   in response to determining the two trace instructions are from a same bus class, select one trace instruction to execute at a given time according to trace instruction priority levels.

11. The semiconductor chip as recited in claim 9, wherein a given bus event filter of the plurality of bus event filters is assigned to monitor bus traffic for a given bus class comprising two or more buses of the plurality of buses.

12. The semiconductor chip as recited in claim 9, wherein two or more bus event filters of the plurality of bus event filters are assigned to monitor bus traffic for a given bus, wherein each of the two or more bus event filters monitor different respective values in the bus traffic for the given bus.

13. A method comprising:
accessing a shared memory for a plurality of functional blocks;
transferring coherent messages across a plurality of buses between the shared memory and a cache coherent controller configured to provide to the functional blocks a consistent data value for a given data block in the shared memory;
selecting at least a first bus and a second bus of the plurality of buses to monitor bus traffic;
selecting from a plurality of bus events a first qualified bus event to detect on the first bus, wherein the first qualified bus event comprises a first cache coherent command;
selecting from the plurality of bus events a second qualified bus event to detect on the second bus, wherein the second qualified bus event comprises a second cache coherent command different from the first cache coherent command;
selecting a respective trace instruction of a plurality of trace instructions for each of the first bus and the second bus; and
in response to detecting the first qualified bus event on the first bus or the second qualified bus event on the second bus executing the respective selected trace instruction.

14. The method as recited in claim 13, wherein in response to finding one or more of the first qualified bus event and the second qualified bus event, the method further comprises incrementing an associated count for each of the first qualified bus event and the second bus event.

15. The method as recited in claim 14, wherein one or more of the plurality of trace instructions cause at least one of the following to be stored in a trace capture buffer: a trace history and trace statistics comprising at least the associated counts.

16. The method as recited in claim 13, wherein a given qualified bus event comprises at least a match between a first value on a given bus of the selected buses and a second value stored in programmable configuration registers, wherein the first and the second values correspond to at least one of the following: a functional block ID, a thread ID, a trust zone mapping, a memory address, and a cache coherence command.

17. The method as recited in claim 13, further comprising:
assigning a given one of a plurality of bus event filters to a given bus of the selected buses, wherein the given bus is a different bus than a previously assigned bus of the plurality of buses to the given one of the plurality of bus event filters;
monitoring bus traffic on the given bus with the assigned bus event filter; and
in response to finding one or more of the qualified bus events on the given bus with the assigned bus event filter, convey an associated trace instruction to be executed.

18. The method as recited in claim 17, wherein in response to determining two or more bus event filters convey a trace instruction to execute, the method further comprises selecting one trace instruction to execute at a given time according to trace instruction priority levels.

19. A programmable trace unit for capturing debug traces on an integrated circuit comprising:
an interface for receiving a plurality of buses configured to transfer coherent messages between a shared memory and a cache coherent controller configured to provide to a plurality of functional blocks a consistent data value for a given data block in the shared memory; and
control logic comprising circuitry programmable to perform multiple selections and is configured to:
select at least a first bus and a second bus of the plurality of buses to monitor bus traffic;
select from a plurality of bus events a first qualified bus event to detect on the first bus, wherein the first qualified bus event comprises a first cache coherent command;
select from the plurality of bus events a second qualified bus event to detect on the second bus, wherein the second qualified bus event comprises a second cache coherent command different from the first cache coherent command;
select a respective trace instruction of a plurality of trace instructions for each of the first bus and the second bus; and
in response to detecting the first qualified bus event on the first bus or the second qualified bus event on the second bus, execute the respective selected trace instruction.

20. The trace unit as recited in claim 19, wherein in response to finding one or more of the first qualified bus event and the second qualified bus event, the control logic is further configured to increment an associated count for each of the first qualified bus event and the second bus event.

21. The trace unit as recited in claim 20, wherein the trace unit further comprises a trace capture buffer, wherein one or more of the plurality of trace instructions cause at least one of the following to be stored in the trace capture buffer: a trace history and trace statistics comprising at least the associated counts.

22. The trace unit as recited in claim 19, wherein the trace unit further comprises a plurality of bus event filters, wherein the control logic is further configured to:
assign a given one of the plurality of bus event filters to a given bus of the selected buses, wherein the given bus is a different bus than a previously assigned bus of the plurality of buses to an associated bus event filter;
monitor bus traffic on the given bus with the assigned bus event filter; and
in response to finding one or more of the qualified bus events on the given bus with the assigned bus event filter, convey an associated trace instruction to be executed.

23. A non-transitory computer readable storage medium comprising program instructions operable to capture debug traces on an integrated circuit, wherein the program instructions are executable to:
access a shared memory for a plurality of functional blocks;
transfer coherent messages across a plurality of buses between the shared memory and a cache coherent controller configured to provide to the functional blocks a consistent data value for a given data block in the shared memory;
select from a plurality of bus events a first qualified bus event to detect on the first bus, wherein the first qualified bus event comprises a first cache coherent command;
select from the plurality of bus events a second qualified bus event to detect on the second bus, wherein the second qualified bus event comprises a second cache coherent command different from the first cache coherent command;

select a respective trace instruction of a plurality of trace instructions for each of the first bus and the second bus; and in response to finding the first qualified bus event on the first bus or the second qualified bus event on the second bus, execute the respective selected trace instruction.

24. The storage medium as recited in claim 23, wherein the program instructions are further executable to:

assign a given one of a plurality of bus event filters to a given bus of the selected buses, wherein the given bus is a different bus than a previously assigned bus of the plurality of buses to an associated bus event filter;

monitor bus traffic on the given bus with the assigned bus event filter; and in response to find one or more of the qualified bus events on the given bus with the assigned bus event filter, convey an associated trace instruction to be executed.

25. The storage medium as recited in claim 24, wherein in response to determining two or more bus event filters convey a trace instruction to execute, the program instructions are further executable to select one trace instruction to execute at a given time according to trace instruction priority levels.

* * * * *

UNITED STATES PATENT AND TRADEMARK OFFICE
CERTIFICATE OF CORRECTION

| | | |
|---|---|---|
| PATENT NO. | : 9,183,147 B2 | Page 1 of 1 |
| APPLICATION NO. | : 13/590150 | |
| DATED | : November 10, 2015 | |
| INVENTOR(S) | : Gulati et al. | |

It is certified that error appears in the above-identified patent and that said Letters Patent is hereby corrected as shown below:

In the Claims:

Column 23, Claim 24, Line 18, please delete "to find" and substitute -- to finding --.

Signed and Sealed this
Twenty-third Day of February, 2016

Michelle K. Lee
*Director of the United States Patent and Trademark Office*